D. A. BIEBINGER.
PLANTER.
APPLICATION FILED FEB. 15, 1911.

1,107,249.

Patented Aug. 18, 1914.
4 SHEETS—SHEET 3.

Witnesses:
Frank W. Bemm
Amy Jehle

Inventor
D. A. Biebinger
By:
Fred Gulach
his Atty.

D. A. BIEBINGER.
PLANTER.
APPLICATION FILED FEB. 15, 1911.

1,107,249.

Patented Aug. 18, 1914.
4 SHEETS—SHEET 4.

Witnesses:
Frank W. Baum
Amy Jehle

Inventor
D. A. Biebinger
By:
Fred Gerlach
his Atty.

UNITED STATES PATENT OFFICE.

DAVID ABSALEM BIEBINGER, OF MOLINE, ILLINOIS, ASSIGNOR TO LA CROSSE PLOW COMPANY, OF LA CROSSE, WISCONSIN, A CORPORATION OF WISCONSIN.

PLANTER.

1,107,249.   Specification of Letters Patent.   Patented Aug. 18, 1914.

Application filed February 15, 1911. Serial No. 608,848.

*To all whom it may concern:*

Be it known that I, DAVID ABSALEM BIEBINGER, a resident of Moline, in the county of Rock Island and State of Illinois, have invented certain new and useful Improvements in Planters, of which the following is a full, clear, and exact description.

The invention relates to planters or seeding-machines.

In machines for planting corn or other seed, it is desirable or necessary to vary the speed of the seed-dropping devices which are driven by the carrying-wheels, to vary the distance between the points where the seeds are deposited in the soil, or to vary the number of seeds deposited.

One object of the present invention is to provide improved seed-dropping mechanism which is readily adjustable, to cause it to be driven at different speeds, to vary the number of kernels delivered to the furrow, and to attain this variation by adjustment of the seed-receptacle or the seed-dropping mechanism, together with the gear-element which serves to drive the seed-plate; the adjustment of this gear-element serving to vary the speed of the seed-plate relatively to the driving-mechanism which is operated by one of the ground-wheels. As a result of this adjustment, variation of the speed of the seed-plate or dropping-mechanism is attained without adjustment, or variation of the speed, of the driving-mechanism which is driven by the ground-wheel. Adjustment of the seed-box and the gear-element movable therewith may be quickly and conveniently effected by the operator, while the machine is or is not in operation.

The invention consists in the several novel features hereinafter set forth and more particularly defined by claims at the conclusion hereof.

The planter illustrated in the drawings, comprises a pair of front ground-wheels 15, which are mounted at the ends of a crank-axle 16, a main supporting-frame 17, and a rear caster-wheel 18, which is mounted on an arm 19, of a standard 20, which is swiveled in a bracket 21, on the main frame 17. The latter is mounted at its front, by brackets 17ª, on the axle 16, and at its rear is sustained by ground-wheel 18, and standard 20. A beam 21', is adjustably mounted on the structure, and carries a suitable soil-opener, such as a plow 22, a sub-soil plow or seed-trench opener 23, a seed-boot 24, for conducting the seed into the furrow, and suitable covering-devices, such as disks 25. Beam 21', has its front pivoted to the crank-portion of axle 16, and has its rear end sustained by a link 26, which is pivoted, as at 27, in bracket 21, and to the beam as at 28. Adjustment of the beam 21', to lower the devices carried thereby, into operative position in the soil, and to raise them into inoperative position, is effected by a hand-lever 29, which is rigidly secured to axle 16, so that it will rock the crank on said axle and to which the beam is pivoted, the rear-link 26, being operated by the beam. A rack 30, secured to frame 17, and a lever-lock 31, provide means for locking the beam in its assigned positions. A counterbalance spring 32, is applied to aid the operator in shifting the beam and the parts carried thereby. A driver's seat 33, is mounted on the frame. The front of frame 17, is cross-connected by an arch-bar 34. A suitable draft connection is connected to the front end of beam 21'.

A receptacle or box 36, for containing seed, is mounted above the frame 17, and beam 21'. This box comprises a bottom 37, a shell 38, and a suitable top-cover 39, which are secured together by outside tie-bolts 40. An opening 42, is formed in the bottom 37, to permit the seed in the box to fall on a rotatable seed-plate 43, having a series of seed-cells 44, therein, these cells being adapted to separate the kernels from the mass in the box and to feed them into a conduit which conducts them to the seed-boot 24, which delivers them into the furrow. The central and outer portions of bottom 37, are connected by integral arches or bridges, beneath which the seed may pass. A rotatable gear-plate or ring 47, is removably held and journaled on a hub 49, formed on bottom 37, and is removably and operatively connected to the seed-plate 43, by studs 48, which fit into openings in said plate. The seed-plate rests on a bottom-plate or cover 50, which has a ledge 51, which forms the bottom of the cells 44, and a discharge opening 52, for the seed in the cells. Cover-plate 50 has a ledge 50ª, for holding the gear-plate 47 in position beneath the seed-plate, has an opening 53, therein for the gear which drives the gear-plate 47, and is removably connected to the box-bottom 37, by a bolt 54, and washer 55, which hold the plate 50, on a shoulder 57 on hub 49. Cover-plate 50 also has a flange 58, extending around the outer edge of the seed-plate. When the seed-box is inverted, nut 54ª may be removed, and then cover-plate 50, gear-plate 47, and seed-plate 43, may be removed or replaced. A keeper 56, is secured to the bottom 37, by a bolt 59, to hold bolt 54, in hub 49, when the seed-box is inverted and nut 54ª has been removed.

Figures 5, 6, 7:
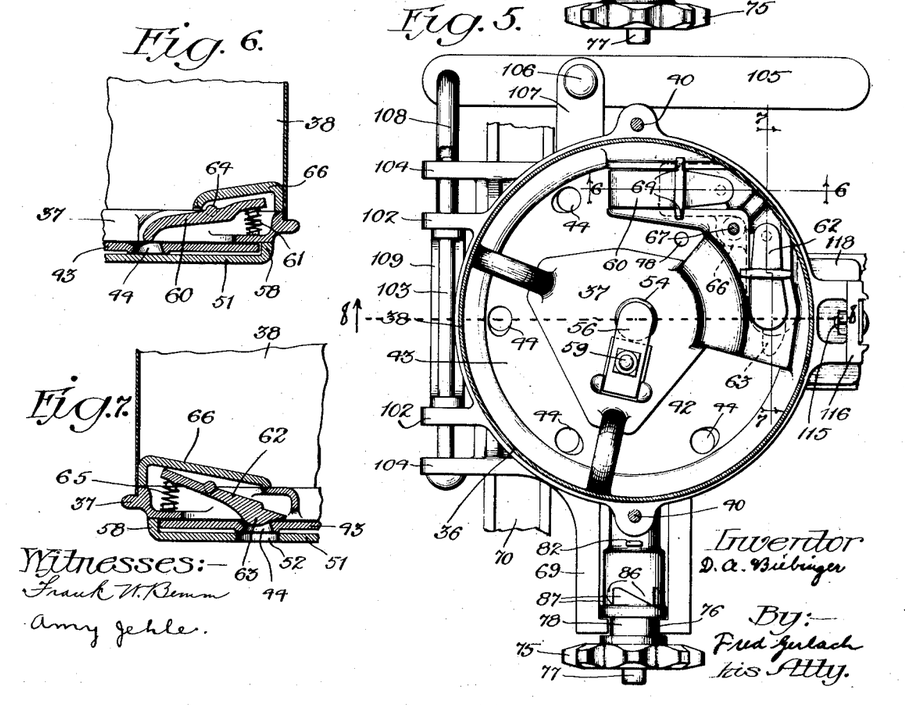
Fig. 5 is a horizontal section taken through the seed box immediately above the mechanism on the bottom thereof, the cover-plate for the seed cut-off and discharger being removed.
Fig. 6 is a detail section taken on the line 6—6 of Fig. 5.
Fig. 7 is a detail section taken on line 7—7 of Fig. 5.
Figure 8:
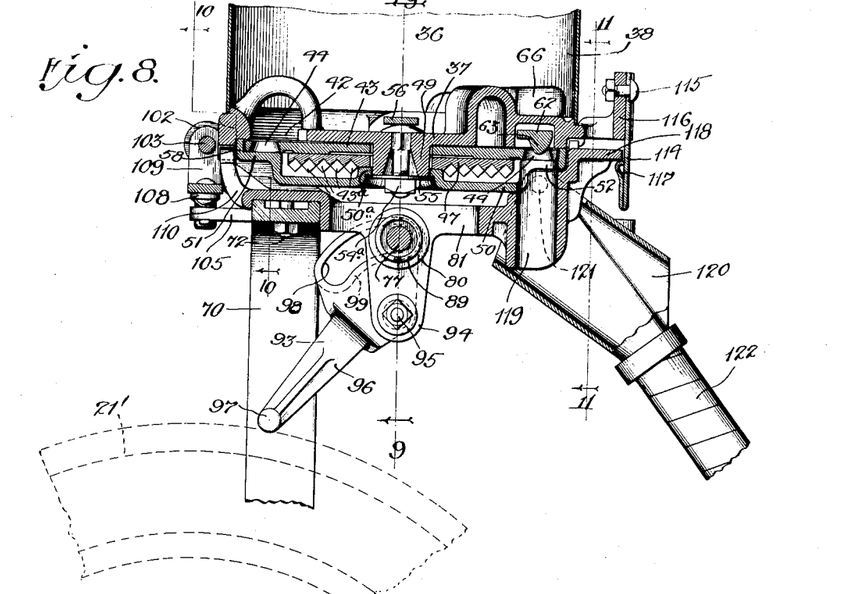
Fig. 8 is a central vertical longitudinal section on line 8—8 of Fig. 5 taken through the lower portion of the seed-box.
Figure 9:
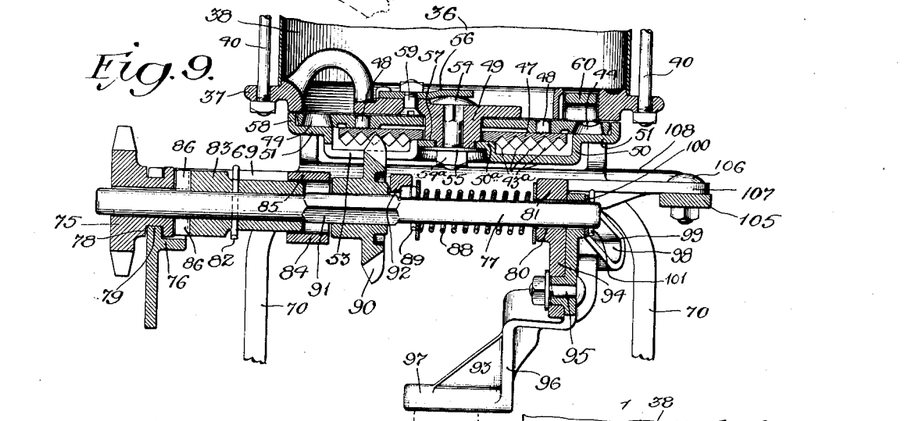
Fig. 9 is a transverse section taken on line 9—9 of Fig. 8.
Figure 10:
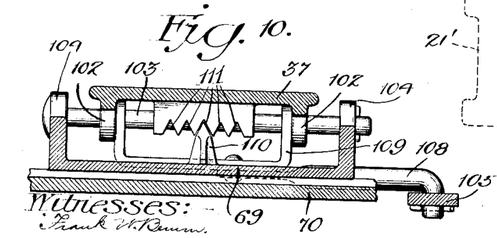
Fig. 10 is a section taken on line 10—10 of Fig. 8.
Figure 11:
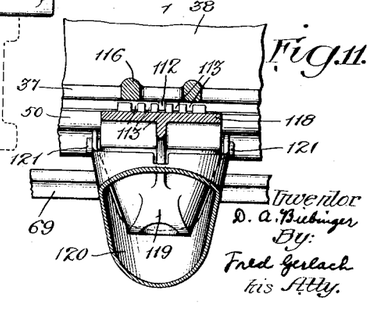
Fig. 11 is a section taken on line 11—11 of Fig. 8.

A cut-off 60, (Figs. 5 and 6) is provided for the seed in the cells 44 of the rotating seed-plate 43, and is pivoted at 64, on bottom 37. A spring 61, yieldingly holds one end of the cut-off against the upper face of the rotating seed-plate. An ejector 62, (Figs. 5 and 7) is pivoted on bottom 37, and is provided with an arm 63, for engaging the seed in the cells as the latter pass into registry with discharge-opening 52, in the bottom-plate 50, and for forcing them out of the cells, to discharge the seed from the seed-plate. A spring 65, yieldingly holds ejector-arm 63, in engagement with the upper face of the seed-plate between the cells and forces the arm to pass into the cells and to discharge the seed from the cells as the latter pass beneath said arm. A cover-plate 66, is removably secured to the top of bottom 37, by a bolt 67, and serves to hold the cut-off and the ejector in operative position and to cover them.

A frame 69, is secured, by bolts 72, upon an arch-bar 70, which is adjustably secured to each of the side-bars of main-frame 17, by a suitable bolt-and-slot-connection 71, which permits the frame 69, and all the parts sustained thereby, to be adjusted fore and aft on the main-frame. Frame 69, serves to sustain the seed-box and the mechanism for driving the gear-plate 47 which is mounted on the box-bottom 37, and the conductors which convey the seed from the discharge-opening 52, in plate 50, to the seed-boot 24.

Figure 1:
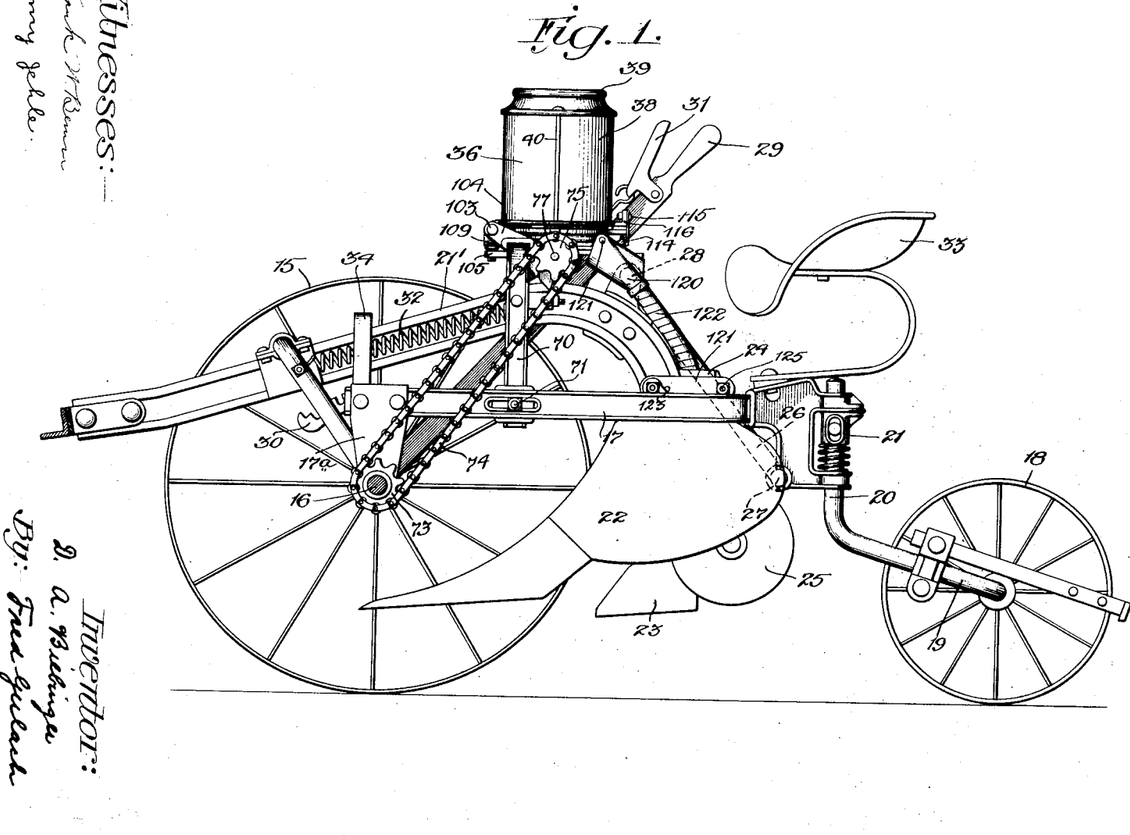
Figure 1 is a side elevation of a planter embodying the invention, one of the front ground-wheels being removed.
Figures 2, 3:
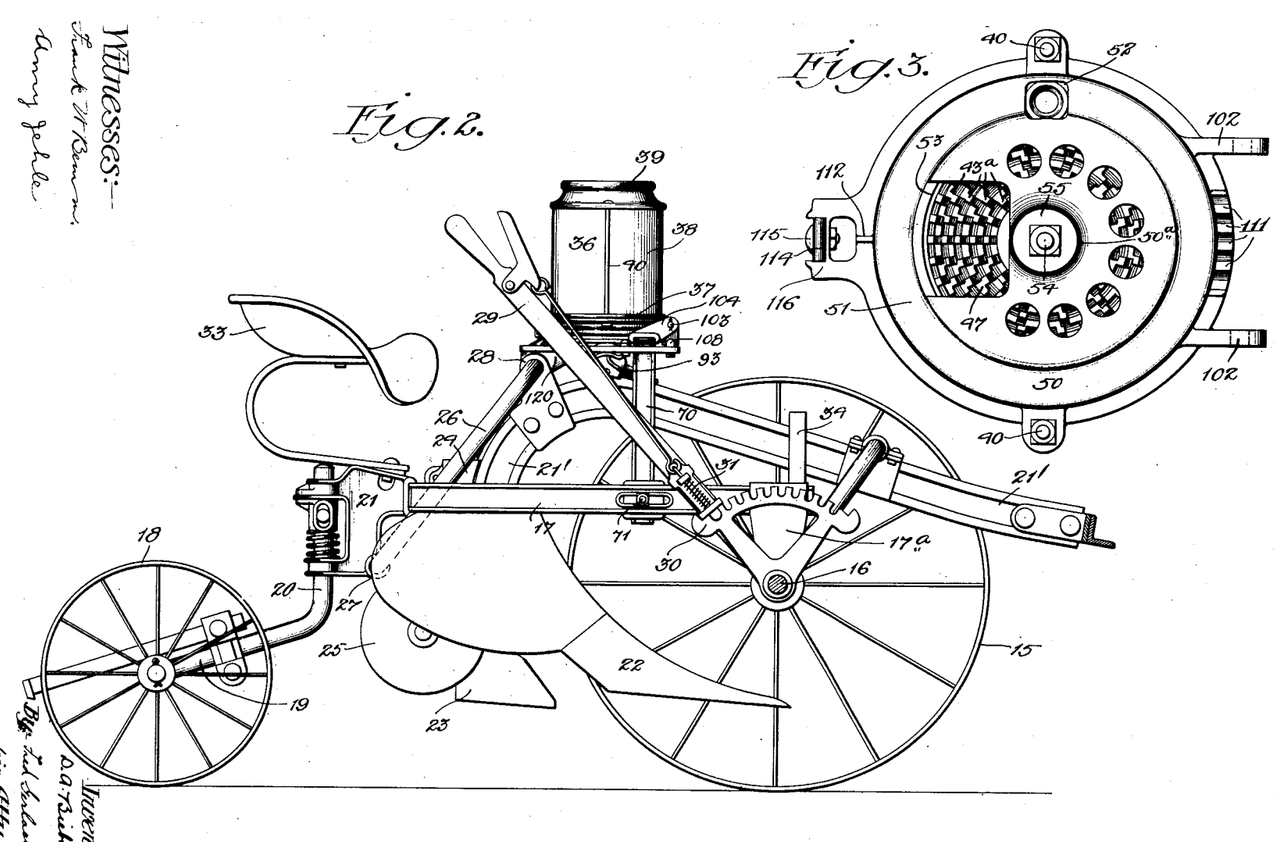
Fig. 2 is a similar view of the opposite side of the machine.
Fig. 3 is an inverted plan of the seed-box.

The mechanism for driving gear-plate 47 from one of the ground-wheels 15, comprises a sprocket-wheel 73, on axle 16, and secured to rotate with said ground-wheel, a sprocket-chain 74, and a sprocket-wheel 75, which is mounted in an open-bearing 76, on frame 69, and on a drive-shaft 77. Sprocket 75, has a groove 78, in its hub, into which a flange 79, on frame 69, projects, for holding said sprocket against longitudinal movement in said frame. Sprockets 73, 75, and chain 74, are operated by one of the ground-wheels, and serve to drive shaft 77, by means of an automatically controlled clutch, whereby said shaft will be driven when the beam carrying the furrow-openers is in lowered or operative position, and will be rendered inoperative when the beam is raised, as shown in Fig. 1. Shaft 77, is revolubly and slidably mounted in a bearing 80, formed in a side-bar 81, of frame 69, and has secured thereto, by a cotter-pin 82, a clutch-member 83, which is slidably and rotatably held in a bearing 84, on a member 85, of frame 69, Clutch-member 83, has one-way teeth 86, adapted to engage corresponding teeth 87, on the hub of sprocket 75. A coil-spring 88, is applied between frame-member 81, and a pin 89, on shaft 77, to normally hold the clutch-member 83, in engagement with sprocket 75. This spring 88, and these one-way clutch-teeth cause the drive-shaft 77, to be inoperative, when the machine is operated backwardly. A gear-wheel 90, is fitted on a square portion 91, of shaft 77, whereby this gear will be driven by said shaft, and the latter may slide through said wheel, which is held against longitudinal movement with the shaft, by frame-members 85, and 92, between which said wheel is disposed. Gear-wheel 90, meshes with the gear-teeth on gear-plate 47, to drive the latter and the seed plate.

The automatically operated controlling-means for clutch-member 83, and shaft 77, consists of a lever 93, which is pivotally held in a depending lug 94, of frame 69, by a bolt 95, and has an arm 96, having an inwardly projecting stud or abutment 97, which is disposed to be operated in one direction, by the beam 21' when the latter is raised to render the furrow-openers inoperative. Lever 93, has an arcuate slot 98, formed therein, and shaft 77, passes through this slot. An inclined cam 99, is formed around said slot, and is adapted to engage a washer 100, held on shaft 77, by a cotter-pin 101, to shift said shaft longitudinally and withdraw clutch-member 83, from sprocket 75, when lever 93, is operated by beam 21'. When the beam is lowered, the gravity of arm 96, and stud 97, and the pressure of spring 88, applied to shaft 77, and through said shaft to inclined cam 99, cause said shaft to be shifted in opposite direction, to shift clutch-member 83 into operative relation with sprocket 75. This mechanism provides a simple and improved structure for automatically controlling the operation of the shaft which causes the seed-plate to be driven, so that, when the furrow-openers are raised, the seed-dropping mechanism will be inoperative, and when the furrow-openers are lowered, the dropping mechanism will be operated.

An important feature of the invention consists in the manner of varying the speed of the seed-dropping mechanism. Gear-plate 47, which is mounted on the seed-box and beneath the seed-plate 43, is provided with a plurality of annular series of gear-teeth 43$^a$, disposed radially of one another, so that each series has a different number of teeth, which will cause the seed-plate to rotate at a different speed, without variation of the gear 90, or its speed. The face of the gear-plate 47, has five annular series of teeth, each of which is adapted to be brought into operative relation with gear 90, and by shift of this plate relatively to said gear, the seed-plate may be driven at five different speeds. It is to be understood, however, that the invention is not restricted to this specific number of series of teeth. The teeth of gear 90, are pointed and the spaces in gear-plate 47, between teeth 43$^a$, are correspondingly shaped, so that one annular series of teeth may be closely disposed to its adjacent series, and the crowns of the teeth 43$^a$, are also V-shaped for this purpose. It will be understood that all of the teeth of the several series on the gear-plate are substantially alike, so that all will be adapted to properly mesh with and be driven by the teeth of gear 90, despite difference between the pitch-diameters of the annular series. In effect, the annular series of teeth 43$^a$, serve as gear-wheels of different diameters, which are adapted to be driven by gear 90, to cause the gear-plate 47, and seed-plate 43, to rotate at correspondingly different speeds, or as a multi-gear element having gears of different diameters for varying its speed relatively to the gear which drives it.

Figure 4:
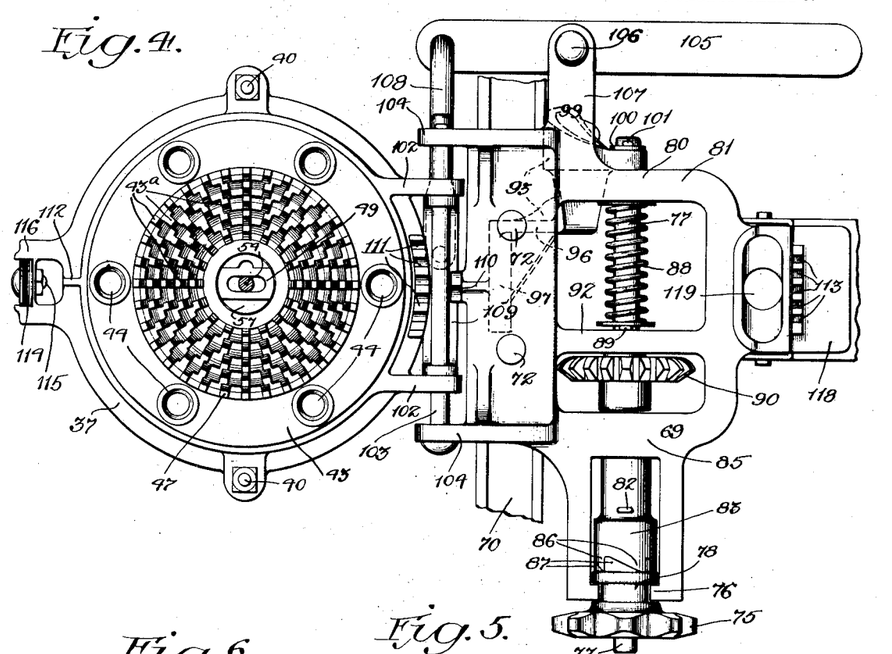
Fig. 4 is a plan showing the frame for supporting the seed-box and the drive-shaft mounted in said frame, the seed-box being shown in position assumed when it is swung to the front of said frame and is inverted, to afford access to the bottom of the box and said shaft; the bottom-cover on the seed-box being removed to more clearly illustrate the gear-plate which drives the seed-plate.

Adjustment of the gear-plate 47, to bring either of its annular series of teeth 43$^a$, into engagement with gear 90, and to vary the speed of the seed-plate, is effected by adjustment of the seed-box which carries said plate. The bottom 37, of the seed-box is formed with projecting ears 102, which are pivotally and slidably held on a rod 103, which is mounted in lugs 104, on frame 69. Resultantly, the seed-box may be swung upwardly about rod 103, to withdraw the teeth of gear-plate 47, from engagement with the teeth of gear 90, and the seed-box may also be shifted transversely of the machine, to bring the teeth of either annular series on gear-plate 47, into engagement with gear 90, when the seed-box is restored to its normal position. Manifestly, the seed-box may swing into inverted position, as shown in Fig. 4, to provide access to the box-bottom, gear-plate 47, and the seed-plate 43, and to permit convenient removal and replacement of the seed-plate when desired. A lever 105, is pivoted, as at 106, on a lug 107, projecting laterally from frame 69, and is connected by a link 108, to a bracket or fork 109, having arms which are mounted between lugs 102, on the box, and to slide on pivot-rod 103, and this lever and connection constitute means for shifting the seed-box laterally or sliding it on rod 103, to correspondingly shift the gear-plate 47, relatively to gear 90, which is mounted in the fixed frame 69.

In order to insure such lateral shift of the seed-box as will bring the teeth of either of the several series into correct position for engagement or registry with gear-wheel 90, and to guide the seed-box into either of said positions, a pointed or V-shaped lug 110, is formed on the top of frame 69, and is adapted to enter either of a series of correspondingly shaped notches 111, on a lug depending from the seed-box. When lug 110, is in either of said notches 111, the seed-box will be correctly positioned laterally to cause one of the series of teeth on gear-plate 47, to mesh with, and be driven by, gear-wheel 90, when the seed-box is in its normal position. At its opposite or free side, the box-bottom 37, is formed with a tooth 112, which is adapted to enter either of a series of notches 113, to securely lock or hold this side of the seed-box against lateral movement, when it is in normal position. A catch consisting of a resilient strip 114, is secured by a bolt 115, to an upwardly projecting lug 116, and serves to lock the seed-box against pivotal movement, and in its normal position so it will be secured against lateral movement by teeth 110, 112, and their coöperating notches 111, 113. Strip 114, has its lower end reverted to form a stop 117, beneath an elongated lug 118, on frame 69, and must be drawn backwardly to clear lug 118, when the seed-box is to be released. Lug 118, is sufficient in width, so that it will coöperate with catch 114, when the seed-box is in either of its laterally variant normal positions.

Frame 69, is provided with a duct 119, for conducting the seed dropping from the cells in the seed-plate, into a hopper 120. Duct 119, is flared at its upper end to catch the seed falling from the seed-plate, in its laterally variant positions. Hopper 120, is pivoted at 121, on frame 69, and a flexible tube 122, which is secured to the hopper, conducts the seed from the hopper to the seed-boot 24.

In operation, the clutch-controlling lever 93, will, when the beam 21', is lowered to hold the furrow-openers in the soil, pass into position to render shaft 77, operative by sprocket 75, and clutch-member 83, said shaft being shifted longitudinally by spring 88. The seed-plate will then be driven by gear-plate 47, which will be driven by gear 90, shaft 77, clutch-member 83, sprocket 75, chain 74, and sprocket 73, which is operated by one of the ground-wheels 15. The operation of the seed-dropping mechanism will be understood by those skilled in the art, from the description hereinbefore given. When the beam 21', is raised, to lift the furrow-openers out of the soil, it will encounter and shift clutch-controlling lever 93, and operate cam 99, to slide shaft 77, and clutch-member 83, laterally so that sprocket 75, will be free to rotate on said shaft, and the latter, as well as the gears for driving the seed-plate will remain inoperative. To vary the speed of the seed-plate, the operator will release catch 114, from frame 69, and then swing the seed-box upwardly about pivot 103, sufficiently to cause tooth 110, to pass out of the notch 111, in which it was disposed, and then the seed-box and gear-plate 47, will be free to, and may, be shifted laterally by means of lever 105, until the gear-plate is positioned so that when it is lowered into engagement with gear 90, the latter will mesh with that series of teeth on the gear-plate 47, which will cause the seed-plate to be driven at the desired speed. Obviously, when gear 90, meshes with the teeth of the outer series on gear-plate 47, the seed-plate will be driven at lowest speed, and the succeeding series will each cause the seed-plate to be driven at a relatively higher speed. After the seed-box has been thus adjusted laterally, it will be lowered and while being lowered, lug 110, and one of the notches 111, will cause the seed-box and gear-plate to be truly positioned, so that gear 90, will mesh with the teeth on the gear-plate, and so that tooth 112, will pass into one of the notches 113. When lowered after such adjustment, catch 114, will hold the seed-box against pivotal movement, and the interfitting lugs and notches on the frame 69, and the seed-box respectively will secure the seed-box against lateral movement, so that gear 90, and gear-plate 47, will be held in operative relation to cause the seed-plate to be driven.

The invention thus provides mechanism, for varying the speed of the seed-dropping devices, by adjustment of the seed-box or the gear-element or plate carried by the box, and whereby substitution of one gear-plate or of one seed-plate for another is avoided. Also improved mechanism for controlling the operation of the shaft which drives the gears for operating the seed-plate, and simple and efficient means for mounting the seed-box and gear mechanism in operative relation.

The construction of the planter set forth, is one which permits the machine to be used simply for plowing when desired, by disconnecting the planting mechanism.

The invention is not to be understood as restricted to the particular form of the invention set forth, since the same may be varied within the scope of the appended claims, without departing from the spirit and scope of the invention.

Having thus described the invention, what I claim as new, and desire to secure by Letters Patent, is:

1. In a planter, the combination of a supporting-frame, ground-wheels, seed-dropping mechanism, a plurality of gears of different diameters adjustable with and for operating said dropping-mechanism, mechanism for driving said gears from one of the ground-wheels, and means for adjustably sustaining the dropping mechanism and said gears, so that either of said gears may be shifted into operative relation with said driving-mechanism, to vary the speed of the dropping mechanism.

2. In a planter, the combination of a supporting-frame, ground-wheels, seed-dropping mechanism, a plate having a plurality of gears of different diameters thereon, for operating said dropping-mechanism, mechanism for driving said gears from one of the ground-wheels, and means for adjustably sustaining the dropping-mechanism and said plate, so that either of said gears may be shifted into operative relation with said driving mechanism, to vary the speed of the dropping-mechanism.

3. In a planter, the combination of a supporting-frame, ground-wheels, seed-dropping mechanism comprising a rotatable seed-plate, a plurality of gears of different diameters rotatable with said plate, mechanism for driving said gears from one of the ground-wheels, and means for adjustably sustaining the seed-plate and said gears, so that either of said gears may be shifted into operative relation with said driving-mechanism, to drive the seed-plate at different speeds.

4. In a planter, the combination of a supporting-frame, ground-wheels, seed-dropping mechanism comprising a rotatable seed-plate, a plate having a plurality of gears of different diameters on one of its faces, operatively connected to said seed-plate, mechanism for driving said gear-plate from one of the ground-wheels, and means for adjustably sustaining said seed-plate and gear-plate, so that either of said gears may be shifted into operative relation with said driving-mechanism, to drive the seed-plate at different speeds.

5. In a planter, the combination of a supporting-frame, seed-dropping mechanism, a plurality of gears of different diameters, operatively connected to said dropping-mechanism, mechanism for driving said gears from one of the ground-wheels, comprising a pinion, and means for adjustably sustaining said gears so that their axes may be shifted to or from said pinion and so that either of said gears may be shifted into engagement with said pinion, to vary the speed of the dropping-mechanism.

6. In a planter, the combination of a supporting-frame, seed-dropping mechanism, a plate having gears of different diameters on one of its faces, operatively connected to the dropping-mechanism, mechanism for driving said plate from one of the ground-wheels, comprising a pinion, and means for adjustably sustaining said gears so that their axes may be shifted to move the gears to or from, and into engagement with said pinion, to vary the speed of the dropping-mechanism.

7. In a planter, the combination of a supporting-frame, seed-dropping mechanism, comprising a rotatable seed-plate, a plate mounted to rotate with the seed-plate, having a plurality of gears on one of its faces, mechanism for driving said gear-plate from one of the ground-wheels, comprising a pinion, and means for adjustably sustaining the gear-plate and seed-plate, so that its axis may be shifted to or from the pinion, and so that either of the gears thereon may be shifted into engagement with said pinion, to vary the speed of the seed-plate.

8. In a planter, the combination of a supporting-frame, a seed-receptacle mounted on the frame, seed-dropping mechanism at the bottom of the receptacle, a plate having a plurality of gears of different diameters, mounted on the receptacle and operatively connected to the dropping-mechanism, and mechanism for driving either of said gears.

9. In a planter, the combination of a supporting-frame, a seed-receptacle mounted on the frame, seed-dropping mechanism comprising a rotatable seed-plate at the bottom of the receptacle, a plate having a plurality of gears of different diameters, mounted on the receptacle and operatively connected to the seed-plate, and mechanism for driving either of said gears.

10. In a planter, the combination of a supporting-frame, a seed-receptacle mounted on the frame, seed-dropping mechanism, comprising a seed-plate rotatably and removably mounted at the bottom of the receptacle, a plate having a plurality of gears of different diameters, removably mounted beneath, and operatively connected to the seed-plate, and mechanism for driving either of said gears.

11. In a lister, the combination of a supporting structure, a plow, a plow beam adjustably sustained by said structure, a seed-trench opener, seed receptacle mounted on said structure, seed-dropping mechanism, mechanism for driving said dropping-mechanism at different speeds, comprising gears mounted on the receptacle and on the frame respectively, and a shiftable connection which permits shift of one of said gears relatively to the other to vary the speed of the dropping mechanism.

12. In a lister, the combination of a supporting structure, a plow adjustably sustained by said structure, a seed-trench opener, a seed-receptacle mounted on said structure, seed dropping-mechanism for driving said dropping-mechanism at different speeds, comprising gears mounted on the receptacle and on the frame, respectively, and a slidable connection which permits shift of one of said gears relatively to the other to vary the speed of the dropping-mechanism.

13. In a lister, the combination of a supporting structure, a plow and a seed-trench opener, adjustably mounted on said structure, a seed-trench opener, a seed-receptacle, mounted on said structure, seed-dropping mechanism, mechanism for driving said dropping-mechanism at different speeds, comprising a multi-gear wheel and a gear adapted to mesh therewith, one of said gears being mounted on the receptacle and the other on the frame, and a shiftable connection which permits relative shift of the gears to cause the dropping-mechanism to be driven at different speeds.

14. In a lister, the combination of a supporting structure, ground-wheels, a plow adjustably sustained by said structure, a seed-trench opener carried by said beam, mounted on said structure, seed-dropping mechanism, mechanism for driving the dropping-mechanism at different speeds, comprising a multi-gear wheel and a gear adapted to mesh therewith, one of which is mounted on the receptacle and the other on said structure, a shiftable connection which permits relative shift of the gears to cause the dropping-mechanism to be driven at different speeds.

15. In a planter, the combination of a seed-receptacle, supporting means therefor, seed-dropping mechanism and a plurality of gears of different diameters, mounted so as to be movable with said receptacle, and mechanism for driving said gears, said receptacle being shiftable to bring either of said gears into operative relation with said driving-mechanism, and whereby the speed of the dropping-mechanism may be varied.

16. In a planter, the combination of a seed-receptacle, supporting-means therefor, seed-dropping mechanism and a plurality of gears of different diameters, mounted so as to be movable with said receptacle, and mechanism for driving said gears, comprising a pinion adapted to mesh with either of said gears, said receptacle being shiftable to bring either of said gears into operative relation with said pinion, and whereby the speed of the dropping-mechanism may be varied.

17. In a planter, the combination of a seed-receptacle, supporting-means therefor, seed-dropping mechanism connected to said receptacle, a plate rotatably connected to the receptacle and operatively connected to said mechanism, and having a plurality of gears of different diameters thereon, mechanism for driving said plate, and an adjustable connection between the receptacle and the supporting-means, which permits the receptacle, dropping-mechanism and said plate to be shifted to bring either of said gears into operative relation with said driving-mechanism, and whereby the speed of the dropping-mechanism may be varied.

18. In a planter, the combination of a seed-receptacle, supporting-means therefor, seed-dropping mechanism comprising a rotatable seed-plate connected to the receptacle, a plate having gears of different diameters thereon, operatively connected to the seed-plate, mechanism for driving said plate, and an adjustable connection between the receptacle and its supporting-means, which permits the receptacle, seed-plate and gear-plate to be shifted to bring either of the gears on the gear-plate into operative relation with said driving mechanism, and whereby the speed of the seed-plate may be varied.

19. In a planter, the combination of a seed-receptacle, supporting-means therefor, seed-dropping mechanism connected to said receptacle, a rotatable plate having gears of different diameters, removably and operatively connected to said dropping-mechanism, mechanism for driving said gear-plate, and an adjustable connection between the receptacle and its supporting-means which permits the receptacle, dropping-mechanism and gear-plate to be shifted to bring either of said gears into operative relation with said driving-mechanism and whereby the speed of the dropping-mechanism may be varied.

20. In a planter, the combination of a seed-receptacle, supporting-means therefor, seed-dropping mechanism comprising a seed-plate rotatably connected to the receptacle, a plate having gears of different diameters, operatively and removably connected to the seed-plate, mechanism for driving said plate, and an adjustable connection between the receptacle and its supporting-means, which permits the receptacle, seed-plate, and gear-plate to be shifted to bring either of said gears into operative relation with the driving-mechanism, and whereby the speed of the seed-plate may be varied.

21. In a planter, the combination of a seed-receptacle, supporting-means therefor, seed-dropping mechanism comprising a seed-plate rotatably and removably connected to the receptacle, a plate having gears of different diameters, removably and operatively connected to the seed-plate, mechanism for driving said gear-plate, and an adjustable connection between the receptacle and its supporting-means, which permits the receptacle, seed-plate and gear-plate to be shifted to bring either of said gears into operative relation with the driving-mechanism, and whereby the speed of the seed-plate may be varied.

22. In a planter, the combination of a supporting-frame, ground-wheels, seed-dropping mechanism, a plurality of gears of different diameters, adjustable with and for operating said mechanism, mechanism for driving said gears from one of the ground-wheels, means for adjustably sustaining the dropping-mechanism and gears, so that either of said gears may be shifted into operative relation with said driving-mechanism, to vary the speed of the dropping-mechanism, and means for securing the gears against disconnection from said driving-mechanism, when they are in their different positions.

23. In a planter, the combination of a supporting-frame, ground-wheels, seed-dropping mechanism, a plate having a plurality of gears of different diameters thereon, for operating said dropping-mechanism, mechanism for driving said gears from one of the ground-wheels, means for adjustably sustaining the dropping-mechanism and said plate, so that either of said gears may be shifted into operative relation with said driving-mechanism to vary the speed of the dropping-mechanism, and means for securing the gears against disconnection from the driving-mechanism, when they are in their different positions.

24. In a planter, the combination of a supporting-frame, seed-dropping mechanism, a plurality of gears of different diameters, operatively connected to said dropping-mechanism, mechanism for driving said gears from one of the ground-wheels, comprising a pinion, means for adjustably sustaining said gears so that their axes may be shifted to or from said pinion and so that either of said gears may be shifted into engagement with said pinion, to vary the speed of the dropping-mechanism, and means for securing the gears against disconnection from the pinion, when they are in either of their different positions.

25. In a planter, the combination of a seed-receptacle, supporting-means therefor, seed-dropping mechanism mounted on the receptacle, a plurality of gears also mounted on the receptacle, mechanism for driving said gears, said receptacle being adjustable to shift either of said gears into operative relation with the driving-mechanism, and to vary the speed of the dropping-mechanism, and means for securing the receptacle in either of its different positions.

26. In a planter, the combination of a seed-receptacle, supporting-means therefor, seed-dropping mechanism and a plurality of gears mounted on the receptacle, mechanism for driving said gears, comprising a pinion adapted to mesh with either of said gears, said receptacle being adjustably mounted, to bring either of said gears into mesh with said pinion, to vary the speed of the dropping-mechanism, and means for securing the receptacle in either of its different positions to hold the pinion and said gears in operative relation.

27. In a planter, the combination of a seed-receptacle, supporting means therefor, seed-dropping mechanism comprising a seed-plate rotatably mounted on the receptacle, a plate having gears of different diameters thereon, mounted to rotate with and drive the seed-plate, mechanism for driving said gears, an adjustable connection for the receptacle, which permits either of the gears carried thereby to be shifted into operative relation with said driving-mechanism, and mechanism for locking the receptacle in its different positions.

28. In a planter, the combination of a seed-receptacle, supporting-means therefor, seed-dropping mechanism comprising a seed-plate rotatably and removably connected to the receptacle, a plate having gears of different diameters removably mounted on the receptacle and connected to said seed-plate, mechanism for driving said gears comprising a pinion, an adjustable connection between the receptacle and its supporting means, which permits shift of the receptacle to bring either of the gears on the gear-plate into mesh with said pinion, and means for locking the receptacle in position to keep either of said gears and said pinion in operative relation.

29. In a planter, the combination of a seed-receptacle, supporting-means therefor, seed-dropping mechanism mounted on the receptacle, mechanism for driving said dropping mechanism, and a sliding connection between said receptacle and its supporting-means.

30. In a planter, the combination of a seed-receptacle, supporting-means therefor, seed-dropping mechanism on said receptacle, mechanism for driving said dropping-mechanism, and a pivotal and sliding connection between said receptacle and its supporting-means.

31. In a planter, the combination of a seed-receptacle, supporting-means therefor, seed-dropping mechanism on the receptacle, a plurality of gears of different diameters, mounted on the receptacle and for driving said mechanism, mechanism for driving said gears, and a sliding connection between the receptacle and its supporting-means.

32. In a planter, the combination of a seed-receptacle, supporting-means therefor, seed-dropping mechanism, and a plurality of gears of different diameters carried by the receptacle, mechanism for driving said gears, and a pivotal and sliding connection between the receptacle and its supporting-means.

33. In a planter, the combination of a seed-receptacle, supporting means therefor, seed-dropping mechanism carried by the receptacle, mechanism for driving said dropping-mechanism, a sliding connection between said receptacle and its supporting-means, and means for locking the receptacle in its different operative positions, against sliding movement.

34. In a planter, the combination of a seed-receptacle, supporting-means therefor, seed-dropping mechanism on the receptacle, mechanism for driving said dropping-mechanism, a pivotal and slidable connection between the receptacle and its supporting-means, and means for locking the receptacle against pivotal and sliding movement in its different positions.

35. In a planter, the combination of a seed-receptacle, supporting-means therefor, seed-dropping mechanism on the receptacle, a plurality of gears of different diameters mounted on the receptacle and for driving said mechanism, mechanism for driving said gears, a sliding connection between the receptacle and its supporting-means, and means for locking the receptacle, when in its different positions, against sliding movement.

36. In a planter, the combination of a seed-receptacle, supporting-means therefor, seed-dropping mechanism on the receptacle, a plate having a plurality of gears mounted on the receptacle, mechanism for driving said plate, a pivotal and sliding connection between the receptacle and its supporting-means, and means for locking the receptacle against pivotal and sliding movement when it is in different operative positions.

37. In a planter, the combination of a seed-receptacle, supporting-means therefor, seed-dropping mechanism, mounted on the receptacle, mechanism for driving the dropping-mechanism, a sliding connection between the receptacle and its supporting-means, and a lever connected to impart sliding movement to the receptacle.

38. In a planter, the combination of a seed-receptacle, supporting-means therefor, seed-dropping mechanism, mounted on the receptacle, mechanism for driving the dropping-mechanism, a sliding connection between the receptacle and its supporting-means, locking-means for said connection and a lever connected to impart sliding movement to the receptacle.

39. In a planter, the combination of a seed-receptacle, supporting-means therefor, seed-dropping mechanism mounted on the receptacle, mechanism for driving said dropping-mechanism, a pivotal and sliding connection between the receptacle and its supporting-means, and a lever for slidably shifting the receptacle.

40. In a planter, the combination of a seed-receptacle, supporting-means therefor, seed-dropping mechanism and a plurality of gears of different diameters, mounted on the receptacle, a sliding connection for permitting the receptacle and said gears to be shifted, mechanism for driving said gears, and a lever for slidably shifting said receptacle and gears to bring either of said gears into operative relation with the driving-mechanism, to vary the speed of the dropping-mechanism.

41. In a planter, the combination of a seed-receptacle, supporting-means therefor, seed-dropping mechanism and a plurality of gears of different diameters mounted on the receptacle and adjustable therewith, a pivotal and sliding connection between the receptacle and its supporting-means, mechanism for driving said gears, and a lever for slidably shifting the receptacle and gears, to vary the speed of the dropping-mechanism.

42. In a planter, the combination of a seed-receptacle, supporting-means therefor, seed-dropping mechanism and a plurality of gears adjustable with the receptacle, a sliding and pivotal connection between the receptacle and its supporting-means, mechanism for driving said gears, a lever for slidably shifting said receptacle, and means for locking the receptacle against pivotal and sliding movement, in its different operative positions.

43. In a planter, the combination of a supporting-frame, ground-wheels, seed-dropping mechanism, and a plurality of gears of different diameters adjustable with and for driving said mechanism, mechanism for driving said gears from one of the ground-wheels, means for adjustably sustaining the dropping mechanism and said gears, so that either of them may be shifted into operative relation with said driving-mechanism, to vary the speed of the dropping-mechanism, and a lever for shifting the dropping-mechanism and gears to different operative positions.

44. In a planter, the combination of a supporting-frame, ground-wheels, seed-dropping mechanism, a plurality of gears, adjustable with and for driving said mechanism, mechanism for driving said gears from one of the ground-wheels, means for adjustably sustaining the dropping-mechanism and said gears, so either of said gears may be shifted into operative relation with said driving-mechanism, to vary the speed of the dropping-mechanism, a lever for shifting said gears and dropping-mechanism, and means for securing said gears and dropping-mechanism in their different operative positions.

45. In a planter, the combination of a frame, a seed-receptacle pivotally connected to said frame, seed-dropping mechanism carried by the receptacle, variable speed gear mechanism for driving the dropping-mechanism, means for confining the receptacle against lateral movement, comprising interlocking teeth on the receptacle and the frame respectively and a locking-device for securing the receptacle against pivotal movement.

46. In a planter, the combination of a frame, a seed-receptacle adjustably mounted on the frame, seed-dropping mechanism carried by the receptacle, variable-speed mechanism for driving the dropping-mechanism, and an interlocking device between the receptacle and the frame, for holding the receptacle in its different positions on said frame.

47. In a planter, the combination of a frame, a seed-receptacle pivotally and slidably mounted on the frame, seed-dropping mechanism carried by the receptacle, variable-speed mechanism for driving the dropping-mechanism, comprising gears on the receptacle and a gear mounted in said frame, and an interlocking device between the frame and the receptacle, which will secure the gears in mesh, when the receptacle is shifted into either of its different positions.

48. In a planter, the combination of a frame, a seed-receptacle adjustably mounted on said frame, seed-dropping mechanism carried by the receptacle, variable-speed gear mechanism for driving the dropping-mechanism, a series of teeth and a tooth adapted to pass between the teeth of said series, and for guiding the receptacle to its different positions on the frame.

49. In a planter, the combination of a frame, a seed-receptacle pivotally and slidably connected to said frame, seed-dropping mechanism carried by the receptacle, variable-speed gear-mechanism for driving the dropping-mechanism, means adjacent the pivot about which the receptacle swings, for guiding the latter to its different positions, a locking device at the opposite side of the receptacle for securing the receptacle against sliding movement, and a latch for holding the receptacle against pivotal movement.

DAVID ABSALEM BIEBINGER.

Witnesses:
   E. S. Case,
   F. E. Davis.